United States Patent
Akers

(10) Patent No.: US 11,590,474 B1
(45) Date of Patent: Feb. 28, 2023

(54) STABLE SOLID PARTICULATE SYSTEM FOR CONTROLLING HUMIDITY TO A SELECTED RANGE

(71) Applicant: JEA Holdings, LLC, Hollister, MO (US)

(72) Inventor: Jeffrey W. Akers, Columbia, MO (US)

(73) Assignee: JEA Holdings, LLC, Hollister, MO (US)

( * ) Notice: Subject to any disclaimer, the term of this patent is extended or adjusted under 35 U.S.C. 154(b) by 424 days.

(21) Appl. No.: 16/993,535

(22) Filed: Aug. 14, 2020

Related U.S. Application Data

(60) Provisional application No. 62/886,512, filed on Aug. 14, 2019.

(51) Int. Cl.

| | |
|---|---|
| *B01J 20/10* | (2006.01) |
| *B65D 81/26* | (2006.01) |
| *B01J 20/32* | (2006.01) |
| *B01J 20/16* | (2006.01) |
| *F24F 3/14* | (2006.01) |
| *B01D 53/04* | (2006.01) |
| *B01D 53/14* | (2006.01) |
| *B01D 53/26* | (2006.01) |

(52) U.S. Cl.
CPC ............ *B01J 20/103* (2013.01); *B01D 53/04* (2013.01); *B01J 20/16* (2013.01); *B01J 20/3272* (2013.01); *B65D 81/266* (2013.01); *F24F 3/1417* (2013.01); *B01D 53/1487* (2013.01); *B01D 53/261* (2013.01); *B01D 53/263* (2013.01); *B01D 2252/10* (2013.01); *B01D 2252/205* (2013.01); *B01D 2253/106* (2013.01); *B01D 2257/104* (2013.01)

(58) Field of Classification Search
CPC .......... B01J 20/103; B01J 53/04; B01J 20/16; B65D 81/266; F24F 3/1417; A61Q 1/02
See application file for complete search history.

(56) References Cited

U.S. PATENT DOCUMENTS

| | | | | |
|---|---|---|---|---|
| 4,274,883 | A | * | 6/1981 | Lumbeck .................. C08K 3/36 106/490 |
| 8,647,653 | B2 | * | 2/2014 | Eng .......................... A61Q 1/02 424/490 |
| 11,307,176 | B2 | * | 4/2022 | Tsukahara ............ G01N 29/022 |

\* cited by examiner

*Primary Examiner* — Sharon Pregler
(74) *Attorney, Agent, or Firm* — Linda Lewis, Attorney at Law

(57) ABSTRACT

A stable, solid, externally dry particulate system for controlling humidity to a selected range comprising a hydrophobic silica component and a hydrophilic silica component where the hydrophobic component comprises about 4 to 10 wt. % hydrophobic nano silica particles and from about 96 to 90 wt. % of a mixture of a saturated solution of at least one soluble solid and undissolved at least one soluble solid, and the hydrophilic micro silica component comprises from about 20 to 40 wt. % hydrophilic silica particles and about 80 to 60 wt.% of the mixture of the saturated solution of at least one soluble solid and the undissolved at least one soluble solid. The saturated solution is made of at least one soluble solid dissolved into a polar liquid and has an equilibrium relative humidity when a saturated solution in the polar liquid.

20 Claims, No Drawings

STABLE SOLID PARTICULATE SYSTEM FOR CONTROLLING HUMIDITY TO A SELECTED RANGE

CROSS-REFERENCE TO RELATED APPLICATIONS

This application claims the benefit of provisional patent application No. 62/886,512 filed Aug. 14, 2019.

STATEMENT REGARDING FEDERALLY SPONSORED RESEARCH

Not Applicable.

APPENDIX

Not Applicable.

BACKGROUND OF THE INVENTION

Field of the Invention

The present invention relates to a stable solid particulate system for controlling humidity in a closed environment to a selected range.

Related Art

Prior art devices have been used to control relative humidity. Although desiccants can be considered a means of humidity control in an extreme sense in that they remove almost all water from the air in a closed system, such as an air-tight container or a container with few leaks, they are unable to maintain a desired range of relative humidity within the closed system. Saturated solutions with excess solute can maintain a modest relative humidity range when ambient temperatures are within a tight range, and are a better choice than desiccants in most cases, but are still limited. The invention on the other hand can remove and add moisture to the environment as well as stabilize the temperature to maintain a tight desired range of relative humidity while remaining in the form of stable dry particles. Optionally, an oxygen absorber can be added to boost the shelf life of perishable goods, prevent adverse color changes, and slow the growth of microbes.

There are many applications such as cigars, foods, pharmaceuticals, leather goods, pyrotechnics, etc., where desiccants are not the best choice because of over-drying. In such examples, the humidity control technology must maintain a desired range of relative humidity for optimum shelf life and quality. Zero% relative humidity is undesirable, as it dries out and damages the product. The most commonly available prior art device and somewhat effective method of controlling humidity in a desired range is the use of saturated solutions with a large excess of solute. The desired relative humidity range, also known as the equilibrium relative humidity (ERH), is an established and well-known unique characteristic of a saturated solution of a particular salt(s) or compound(s) used as the solute.

Inorganic salts are effective as this solute and are most often used, although many compounds including water soluble organics can be used as well in appropriate systems. These compounds, when in a saturated solution with a large excess, regulate the water vapor pressure in a closed environment to a unique range below that of pure water. In that environment, the solution will release moisture when below its ERH causing solute to precipitate out of the solution. It will absorb moisture from the environment when above its ERH until the excess solute goes completely into solution. While a mixture of solid solute and solution coexist the relative humidity of the environment will be proactively coerced toward the ERH, which is desired relative humidity range.

Although saturated solutions with a large excess of solute are fairly effective at controlling humidity, in practice they have very significant limitations. Temperature fluctuations in the environment are the primary cause of deviations from the expected ERH value for the environments above saturated solutions. In addition, absorption of moisture from the environment is limited by low surface area, surface dilution (segregation due to gravity and lack of mixing) and the Heat of Solution of the used solute. Surface dilution issues are aggravated further by use of gelling and solidification agents.

The majority of commercialized humidity control devices are based on saturated solutions with a large excess of solute and are described as gritty viscous solutions contained within water vapor permeable pouches. The viscous solution in such cases usually includes water, solute, and sometimes a thickening material such as xanthan gum. These solutions prove difficult to handle because they are sticky liquids which can spill, are gritty and hard to dispense, diffuse through material, and interfere with seals as well as require special packaging to contain them. Even when solidified or gelled these solutions can weep or diffuse out of packaging which must by nature be permeable to water vapor in order to function. Compounding this problem is the fact that the tendency to weep becomes greater as the solute attracts moisture from its environment and becomes less viscous. To summarize saturated solutions with a large excess of solute are good at humidifying an environment but are only marginally effective at absorbing moisture, are adversely effected by temperature fluctuations, require special packaging and are usually a gritty sticky liquid. The present invention addresses these limitations.

Accordingly, there remains a need for a stable, externally dry solid particulate material which effectively controls humidity within a selected range. The term "externally dry" means that the particles appear to be dry, even though they contain sorbed/encapsulated water.

Examples of known prior art devices are described in the references listed below, which are hereby incorporated by reference.

U.S. Pat. No. 8,647653 discloses a cosmetic water-containing product made of core-shell particles and a carrier powder. This product is not suitable to regulate relative humidity as it does not contain a saturated solution.

SUMMARY OF THE INVENTION

A stable, solid, externally dry particulate system for controlling humidity to a selected range comprising a hydrophobic silica component and a hydrophilic silica component wherein the hydrophobic component comprises about 4 to 10 wt. % hydrophobic nano silica particles and from about 96 to 90 wt. % of a mixture of a saturated solution and undissolved soluble solid and wherein the hydrophilic micro silica component comprises from about 20 to 40 wt. % hydrophilic silica particles and about 80 to 60 wt.% of the mixture of the saturated solution and the undissolved soluble solid. The mixture of saturated solution and undissolved soluble solid comprises a small excess of at least one soluble solid dissolved into a polar liquid and has an equilibrium relative humidity when a saturated solution in the polar liquid. The soluble solid is selected from the group consisting of water soluble inorganic salts and water soluble organic compounds. The system is made by blending together from about 4 to 40 wt. % of the hydrophilic component with about 96 to 60 wt. % of the hydrophobic component. The system absorbs and releases moisture as stable solid particulate system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The present invention asserts a unique, benign, passive device and composition. The vast majority of the embodiments are comprised of constituents that are indirect food additives or considered food contact safe.

In a preferred embodiment, the polar solvent is water. This embodiment asserts a unique high capacity carrier combination of hydrophilic and hydrophobic silica that in concert with the fact that the invention needs less excess solute with the saturated solution, it can contain more water to humidify the environment per unit mass than current solidified alternatives. The ability of hydrophobic silica particles to settle on the surfaces of saturated aqueous solution droplets is used to form a layer on the surface of the droplets that prevents them from coalescing back into a liquid phase. This stabilizes the droplets and makes it possible to formulate an aqueous phase into a free flowing powder that is externally dry. There are two reasons for this unusual behavior of aqueous saturated solutions: the high surface tension of water and the repulsion between the aqueous phase and the hydrophobic silica particles. The extraordinary surface tension of aqueous solutions facilitates the generation of fairly stable fine water droplets. The hydrophobic nature of the silica particles prevents them from being wetted by the aqueous solution. Therefore the particles collect at the outer boundary of the droplets, separating the droplets from each other and keep them from coalescing into larger drops.

The soluble solids are inorganic salts that are effective and most often used, although many compounds including water soluble organic compounds can be used as well in appropriate systems. These compounds, when in a saturated solution with a small excess, regulate the water vapor pressure in a closed environment to a unique range below that of pure water. A small excess of the soluble solids can range from about 0.1 wt. % to about 10.0 wt. % excess in the saturated solution. In that environment, the solution will release moisture when below its ERH causing solute (soluble solids) to precipitate out of the solution. It will absorb moisture from the environment when above its ERH until the excess solute goes completely into solution. While a mixture of solid solute (the excess soluble solids) and solution coexist the relative humidity of the environment will be proactively coerced toward the ERH, which is desired relative humidity range.

The amount of soluble solids used is dependent on the solubility of the soluble solids in the particular polar solvent. Typically, the amount of soluble solids present in the particulate system is in the range of from about 20.0 to 90.0 wt. %. Preferably, the amount of soluble solids is present in the range of from about 25.0 to 65.0 wt. %.

Preferably, the hydrophobic silica can be obtained by hydrophobizing fumed silica, which is a pyrogenically prepared silicon dioxide powder. The fumed silica powder has on its surface reactive centers which can react with a hydrophobizing agent. For example, Aerosil® R7200 (hydrophobizing agent 2-propenic acid, 2-methyl-,3-(trimethoxysilyl)propyl ester, specific surface area approx. 150 $m^2/g$), Aerosil® R8200 (silane-amine, 1,1,1-trimethyl-N-(trimethylsilyl)-, approx. 150 $m^2/g$), Aerosil® R816 (silane, hexadecyltrimethoxy-, approx. 200 $m^2/g$), Aerosil® R972 (silane, dichlorodimethyl-, approx. 100 $m^2/g$), Aerosil® R974 (silane, dichlorodimethyl-, approx. 170 $m^2/g$), Aerosil® R202 (silicones and siloxanes, dimethyl-, approx. 100 $m^2/g$), Aerosil® R104 (octamethylcyclotetrasiloxane, approx. 150 $m^2/g$), Aerosil® R106 (octamethylcyclotetrasiloxane, approx. 250 $m^2/g$), Aerosil® R805 (octylsilane, approx. 150 $m^2/g$), Aerosil® R812 and R812S (hexamethyldisilazane, approx. 260 $m^2/g$) are hydrophobic silica. In a preferred embodiment, the hydrophobic silica is Aerosil® R202 silica made by EVONIK, a fumed silica which has been surface treated with polydimethylsiloxane, having a mean particle size of 14 nm. In a preferred embodiment, the hydrophilic silica is Sipernate® 22 silica made by EVONIK, precipitated silica, aluminum and calcium silicates having an average particle size of 120 μm. Preferably, the average particle size of the hydrophilic silica is larger than the average size of the hydrophobic silica. If the hydrophilic silica is an equal or smaller size than the hydrophobic silica, the product fails.

The stability of these droplets in powder form can be further augmented by adding larger particle hydrophilic silica relative to the hydrophobic silica which has been treated with some saturated aqueous solution after the droplets were converted into an externally dry, free flowing powder. This makes it possible to produce a rather stable, dry free flowing powder for humidity control purposes which can both release to and absorb water vapor from an environment when it is outside a desired range of relative humidity. This externally dry, free flowing powder can contain as much as 92 wt. % saturated aqueous solution. The necessary average droplet size for the solution and nano-hydrophobic silica distribution to produce the powder can be achieved by use of a commercial high shear mixer (19,000 RPM+).

The present invention asserts the possible inclusion of a volatile organic absorber. Cyclodextrins (cyclic oligosaccharides) and their derivatives can be added in this instance to the saturated solution formulation both to absorb undesirable environmental volatile organic compounds (VOC) and help adjust the equilibrium relative humidity (ERH) of the solution to the desired value.

In a preferred embodiment, the present invention includes a phase change material(s) with a high heat of transformation in an in-permeable container(s) to damp out environmental temperature fluctuations and enhance the performance of the humidity control composition and device. Organic and inorganic salt solutions, paraffins, fatty acids, polyethylene glycols (PEGs), aqueous solutions of polyethylene glycols, ester and inorganic salt solutions or mixtures can be used in this invention as the Phase Change Materials (PCMs). The preference for PCM components are for those that can be sorbed on a carrier or encapsulated. The PCM(s) are selected to transition from one phase to another within a range which overlaps or is close to the desired temperature range. The PCM(s) is to be packaged in a durable thermally conductive barrier plastic packet, composite packet or incorporated in an elastomer that is attached to or in the close proximity of the humidity control device.

In a preferred embodiment, the present invention contains an environmental elemental oxygen absorber. Powdered Iron metal can be added in this instance to one of the chlorine rich versions of the free flowing powdered saturated solution. The elemental iron powder in the microcosm created by the surrounding powdered saturated solution is capable of rapidly reacting with and consuming available elemental environmental oxygen to ultimately form stable iron oxides.

In a preferred embodiment, the present invention includes a precision high speed moisture absorber. Any moisture absorbing technology that is of a benign nature, chemically compatible and can be set to start absorbing moisture at a specific relative humidity could potentially be used in concert with this invention. The present invention can use any combination of known water soluble compounds to produce the saturated solutions to generate the desired equilibrium relative humidity, although inorganic alkali and alkaline earth metal halides are preferred as a component.

DETAILED DESCRIPTION OF THE INVENTION

This invention provides a stable, externally dry powder in a permeable container for controlling relative humidity, oxygen and temperature in a closed or semi closed system such that the product or materials in its vicinity are protected and not degraded or denatured in any manner. This is accomplished by incremental improvement, combining synergistic complementary technologies and an innovative high capacity carrier.

Example 1

TABLE 1

Saturated water solution with a small excess of salt used in Examples 1 and 2

| Component | Amount (g) | Wt. % |
|---|---|---|
| Sodium Chloride - Inorganic salt | 198.9 | 19.89 |
| Potassium Chloride - Inorganic salt | 108.5 | 10.85 |
| B-Cyclodextrin - Oligosaccharide and Volatile organic absorber | 15.8 | 1.58 |
| Ammonium Chloride - Inorganic salt | 3.4 | 0.34 |
| Deionized Water | 673.4 | 67.34 |
| Total | 1000.0 | 100.0 |

1) A saturated water solution and slurry mixture was made by dissolving all but a slight excess of the soluble compounds of Table 1 in the water at elevated temperature (60° C.+) and stored in a sealed container. A small amount of undissolved soluble solid remained in the saturated solution.

Hydrophilic Component A

2) A 158.4 g amount of the saturated solution and slurry mixture, still at elevated temperature, is added to 67.8 g hydrophilic silica Sipernat® 22 and rapidly hand mixed in a Ziploc® bag until a uniform powder is formed. The dry particulate material is set aside in a sealed container to cool to ambient temperature (steady 20° C.).

Hydrophobic Component B

3) The remaining 841.6 g saturated solution and undissolved solid mixture is allowed to cool to ambient temperature for 24 hours in the sealed container.
4) The remaining saturated solution and undissolved solid mixture is heated and held at a steady 25° C. temperature for 12 hours in the sealed container.
5) The 62.15 g of Aerosil® R202 Nano-hydrophobic silica is placed in the bottom of the mixing vessel of a high shear (19,000+RPM) sealed mixer.
6) The liquid phase of the remaining saturated solution still at 25° C. is quickly poured over the Nano-hydrophobic silica in the bottom of the mixing vessel and the mixer sealed.
7) The mixer is pulsed two 20 second intervals at the maximum rated RPM.
8) The dry component B is produced from the mixing.

Stable Solid Particulate System

9) By hand mixing 20% hydrophilic powder component A with 80% hydrophobic powder component B the stable solid particulate system for controlling humidity to a selected range is made.
10) If an oxygen absorbing capacity is desired a portion fine iron powder may be added to the dry powder composition in step 9.

TABLE 2

Example 1 Stable solid particulate system for controlling humidity to a selected range

| Component | Wt. % |
|---|---|
| Soluble Solid | |
| Sodium Chloride - Inorganic salt | 17.6 |
| Potassium Chloride - Inorganic salt | 9.6 |
| B-Cyclodextrin - Volatile organic absorber | 1.4 |
| Ammonium Chloride - Inorganic salt | 0.30 |
| Deionized Water | 59.6 |
| Aerosil ® R202 Hydrophobic Silica | 5.5 |
| Sipernate ® 22 Hydrophilic Silica | 6.0 |
| Total | 100.0 |

A device is made to maintain the relative humidity close but below 70% and absorb volatile organic compounds from the surrounding environment comprising a Tyvek® 1059B flash spun high density polyethylene fiber synthetic material, or a cellulose acetate paper laminate pouch filled with the stable solid particulate system for controlling humidity to a selected range of Example 1, shown in Table 2. Optionally, the device may contain a thermally conductive barrier bag pouch filled with a commercial phase change material (PCM) with a sharp phase change temperature of 20° C.

Example 2 Example 2 was prepared according to the method disclosed in Example 1, with slightly different ratios of Hydrophilic Component A to Hydrophobic Component B.

TABLE 3

Example 2 Stable solid particulate system for controlling humidity to about 70% or less and absorb oxygen

| Component | Wt. % |
|---|---|
| Soluble Solid | |
| Sodium Chloride - Inorganic salt | 16.72 |
| Potassium Chloride - Inorganic salt | 9.12 |
| B-Cyclodextrin - Volatile organic absorber | 1.33 |

TABLE 3-continued

Example 2 Stable solid particulate system for controlling humidity to about 70% or less and absorb oxygen

| Component | Wt. % |
|---|---|
| Ammonium Chloride - Inorganic salt | 0.29 |
| Deionized Water | 56.62 |
| Aerosil ® R202 Hydrophobic Silica | 5.22 |
| Sipernate ® 22 Hydrophilic Silica | 5.7 |
| Iron metal powder | 5.0 |
| Total | 100.0 |

A device is made to maintain the relative humidity close to but below 70% with greater stability than Example 1 and to absorb volatile organic compounds from the surrounding environment comprising a Tyvek® 1059B material or a cellulose acetate paper laminate pouch filled with the stable solid particulate system for controlling humidity to a selected range of Example 2, shown in Table 3.

TABLE 4

Example 3 Stable solid particulate system for controlling humidity to about 63%
Using a 66.1 wt. % Solution of Potassium Citrate

| Component | Wt. % |
|---|---|
| Potassium Citrate monohydrate - Organic Salt | 58.5 |
| Deionized Water | 30.0 |
| Aerosil ® R202 Hydrophobic Silica | 5.5 |
| Sipernate ® 22 Hydrophilic Silica | 6.0 |
| Total | 100.0 |

This device maintains the relative humidity close to but below 63% comprising a Tyvek 1059B or a cellulose acetate paper laminate pouch filled with the stable solid particulate system of Example 3, as shown in Table 4.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A solid particulate system for controlling humidity to a selected range comprising:
   a hydrophobic silica component;
   wherein the hydrophobic silica component comprises about 4 to 10 wt.% hydrophobic nano silica particles and from about 96 to 90 wt.% of a mixture of a saturated solution of an at least one soluble solid and undissolved at least one soluble solid; and
   a hydrophilic silica component;
      wherein the hydrophilic silica component comprises from about 20 to 40 wt.% hydrophilic silica particles and about 80 to 60 wt.% of the mixture of the saturated soluble solid solution and the undissolved at least one soluble solid;
   wherein the mixture of saturated solution of at least one soluble solid and undissolved at least one soluble solid comprises a saturated solution of the at least one soluble solid dissolved in a polar liquid and a small excess of the undissolved at least one soluble solid in the saturated solution;
   wherein the at least one soluble solid provides an equilibrium relative humidity when in the saturated solution in the polar liquid;
   wherein system is made by blending together from about 4 to 40 wt.% of the hydrophilic component with about 96 to 60 wt.% of the hydrophobic component;
   wherein the particulate system is stable and externally dry; and
   wherein the particulate system absorbs and releases moisture.

2. The particulate system of claim 1, wherein the at least one soluble solid further comprises a volatile organic absorber.

3. The particulate system of claim 1, wherein the at least one soluble solid is selected from the group consisting of inorganic salts and water soluble organic compounds.

4. The particulate system of claim 3, wherein the hydrophobic silica comprises a fumed silica which has been surface treated with polydimethylsiloxane.

5. The particulate system of claim 4, wherein the hydrophilic silica comprises precipitated silica, aluminum and calcium silicates.

6. The particulate system of claim 5, wherein the average particle size of the hydrophilic silica is greater than the average particle size of the hydrophobic silica.

7. The particulate system of claim 6, wherein the amount of soluble solid is present in the particulate in the amount of from about 20 to 90 wt. %.

8. A solid particulate system for controlling humidity to a selected range comprising:
   a hydrophobic silica component;
   wherein the hydrophobic silica component comprises about 4 to 10 wt.% hydrophobic nano silica particles and from about 96 to 90 wt.% of a mixture of a saturated solution of at least one soluble solid and undissolved at least one soluble solid; and
   a hydrophilic silica component;
   wherein the hydrophilic silica component comprises from about 20 to 40 wt.% hydrophilic silica particles and about 80 to 60 wt.% of the mixture of the saturated solution of at least one soluble solid and undissolved at least one soluble solid;
   wherein the mixture of saturated solution of at least one soluble solid and undissolved at least one soluble solid comprises a saturated solution of at least one soluble solid dissolved in a polar solvent and a small excess of undissolved at least one soluble solid in the saturated solution;
   wherein the small excess of soluble solid is from about 0.1 to 10 wt. % excess of the at least one soluble solid dissolved into a polar liquid;
   wherein the amount of at least one soluble solid is present in the particulate in the amount of from about 20 to 90 wt. %;
   wherein the at least one soluble solid provides an equilibrium relative humidity when in a saturated solution in the polar liquid;
   wherein system is made by blending together from about 4 to 40 wt.% of the hydrophilic component with about 96 to 60 wt.% of the hydrophobic component;

wherein the particulate system is stable and externally dry; and wherein the particulate system absorbs and releases moisture.

9. The particulate system of claim 8, wherein the at least one soluble solid is selected from the group consisting of inorganic salts and water soluble organic compounds; and wherein the particulate system further comprises a high speed moisture absorber.

10. The particulate system of claim 9, wherein the hydrophobic silica comprises a fumed silica which has been surface treated with polydimethylsiloxane.

11. The particulate system of claim 10, wherein the hydrophilic silica comprises precipitated silica, aluminum and calcium silicates.

12. The particulate system of claim 11, wherein the average particle size of the hydrophilic silica is greater than the average particle size of the hydrophobic silica.

13. The particulate system of claim 12, wherein the at least one soluble solid further comprises a volatile organic absorber.

14. A relative humidity control system comprising:
an enclosed system comprising a container; and
a solid particulate system for controlling humidity to a selected range within the container comprising:
a hydrophobic silica component;
wherein the hydrophobic silica component comprises about 4 to 10 wt.% hydrophobic nano silica particles and from about 96 to 90 wt.% of a mixture of a saturated solution of at least one soluble solid and undissolved at least one soluble solid; and
a hydrophilic silica component;
wherein the hydrophilic silica component comprises from about 20 to 40 wt.% hydrophilic silica particles and about 80 to 60 wt.% of the mixture of saturated solution of at least one soluble solid and undissolved at least one soluble solid;
wherein the mixture of saturated solution of at least one soluble solid and undissolved at least one soluble solid comprises a mixture of a saturated solution of at least one soluble solid dissolved in a polar solvent and a small excess of undissolved at least one soluble solid in the saturated solution;

wherein the at least one soluble solid provides an equilibrium relative humidity when in a saturated solution with the polar liquid;

wherein system is made by blending together from about 4 to 40 wt.% of the hydrophilic component with about 96 to 60 wt.% of the hydrophobic component;

wherein the particulate system is stable and externally dry; and wherein the particulate system absorbs and releases moisture to control the relative humidity.

15. The relative humidity control system of claim 14, wherein the amount of at least one soluble solid is present in the particulate in the amount of from about 20 to 90 wt. %; and wherein the small excess of undissolved at least one soluble solid is from about 0.1 to 10 wt. % excess of the at least one soluble solid dissolved into a polar liquid.

16. The relative humidity control system claim 15, wherein the at least one soluble solid is selected from the group consisting of inorganic salts and water soluble organic compounds.

17. The relative humidity control system claim 16, wherein the hydrophobic silica comprises a fumed silica which has been surface treated with polydimethylsiloxane; and wherein the hydrophilic silica comprises precipitated silica, aluminum and calcium silicates.

18. The particulate system of claim 17, wherein the average particle size of the hydrophilic silica is greater than the average particle size of the hydrophobic silica; and wherein the at least one soluble solid includes a volatile organic absorber.

19. The relative humidity control system of claim 18, further comprising a phase change material inside the container.

20. The relative humidity control system of claim 19, further comprising an oxygen absorber.

\* \* \* \* \*